(12) United States Patent
Oh et al.

(10) Patent No.: US 8,840,071 B2
(45) Date of Patent: Sep. 23, 2014

(54) CABLE SUPPORT AND METHOD

(75) Inventors: Michael H.-S. Oh, Twinsburg, OH (US); Raymond S. Laughlin, Middlefield, OH (US)

(73) Assignee: ERICO International Corporation, Solon, OH (US)

( * ) Notice: Subject to any disclaimer, the term of this patent is extended or adjusted under 35 U.S.C. 154(b) by 149 days.

(21) Appl. No.: 12/196,315

(22) Filed: Aug. 22, 2008

(65) Prior Publication Data

US 2009/0057498 A1 Mar. 5, 2009

Related U.S. Application Data

(60) Provisional application No. 60/968,618, filed on Aug. 29, 2007.

(51) Int. Cl.
| | |
|---|---|
| *F16L 3/22* | (2006.01) |
| *H02G 3/32* | (2006.01) |
| *F16L 3/10* | (2006.01) |
| *F16L 3/24* | (2006.01) |
| *H02G 3/00* | (2006.01) |

(52) U.S. Cl.
CPC ............... *H02G 3/263* (2013.01); *F16L 3/221* (2013.01); *H02G 3/32* (2013.01); *F16L 3/1075* (2013.01); *F16L 3/24* (2013.01)
USPC .................. 248/68.1; 248/65; 248/73; 248/58

(58) Field of Classification Search
USPC ........ 248/74.3, 68.1, 58, 59, 74.1, 73, 62, 65, 248/304
See application file for complete search history.

(56) References Cited

U.S. PATENT DOCUMENTS

| | | | |
|---|---|---|---|
| 4,181,279 A | 1/1980 | Perrault et al. | |
| 4,344,593 A | 8/1982 | Canto | |
| 4,709,888 A * | 12/1987 | Cubit et al. | 248/73 |
| 5,740,994 A * | 4/1998 | Laughlin | 248/68.1 |

(Continued)

FOREIGN PATENT DOCUMENTS

| | | |
|---|---|---|
| DE | 4311765 | 10/1994 |
| EP | 1074773 | 2/2001 |

(Continued)

OTHER PUBLICATIONS

"Spring Steel Fasteners" Steel City, Thomas & Betts Corporation, (2003), pp. 1, 2, 42, 43.

*Primary Examiner* — Todd M Epps
(74) *Attorney, Agent, or Firm* — Renner, Otto, Boisselle & Sklar, LLP

(57) ABSTRACT

A J-hook cable support includes a semicircular saddle, a stem at one side of the saddle, and a tip at the other side of the saddle. The stem includes protruding tabs able to engage snap-on brackets in order to engage structural parts, or to couple multiple cable supports together. The stem may have two pairs of tabs at different heights along the stem away from the saddle. The tabs may be bent pieces of the metal of the stem, bent toward the back of the stem, away from the cable-receiving area defined by the saddle. The snap-on brackets may include one or more pairs of notches for engaging the tabs of one or more of the cable supports. A wire retainer may be used to close off the cable-receiving area, with the wire coupled to both the tip and the stem.

25 Claims, 10 Drawing Sheets

(56) References Cited

U.S. PATENT DOCUMENTS

| | | |
|---|---|---|
| D407,963 S | 4/1999 | Gretz et al. |
| 5,957,416 A | 9/1999 | Sellati |
| 5,961,081 A * | 10/1999 | Rinderer ............... 248/68.1 |
| 5,964,434 A | 10/1999 | Lynch, Jr. |
| 5,988,570 A | 11/1999 | Gretz |
| 6,053,458 A | 4/2000 | Meyer |
| 6,222,128 B1 | 4/2001 | Gretz |
| 6,332,594 B2 | 12/2001 | Shelton et al. |
| 6,508,440 B2 | 1/2003 | Schmidt |
| 6,565,048 B1 * | 5/2003 | Meyer ..................... 248/58 |
| 6,629,676 B1 | 10/2003 | Gretz |
| 6,719,247 B1 | 4/2004 | Botting |
| 6,945,501 B2 | 9/2005 | Thompson |
| 6,959,898 B1 | 11/2005 | Laughlin et al. |
| 7,021,591 B1 * | 4/2006 | Gretz ..................... 248/68.1 |
| 7,407,138 B1 | 8/2008 | Gretz |
| 7,520,476 B2 * | 4/2009 | Caveney et al. ............ 248/72 |
| 7,837,156 B1 * | 11/2010 | Handler ..................... 248/58 |
| 2004/0113024 A1 * | 6/2004 | Caveney et al. ............ 248/49 |
| 2008/0093510 A1 | 4/2008 | Oh et al. |
| 2010/0102175 A1 * | 4/2010 | Dockery et al. ........... 248/74.3 |

FOREIGN PATENT DOCUMENTS

| | | |
|---|---|---|
| EP | 1075721 | 7/2003 |
| FR | 2726697 | 5/1996 |
| WO | 2004054060 | 6/2004 |

* cited by examiner

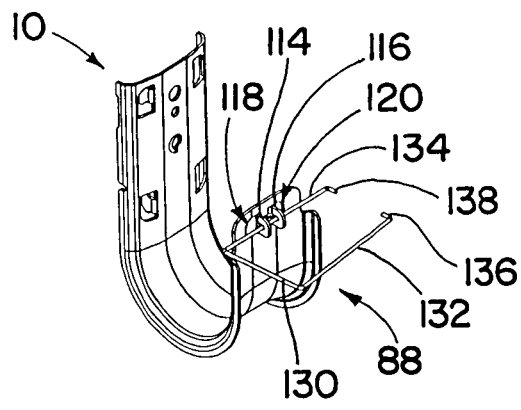 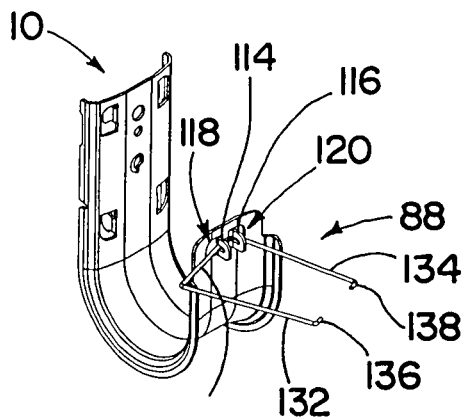
FIG. 5   FIG. 6
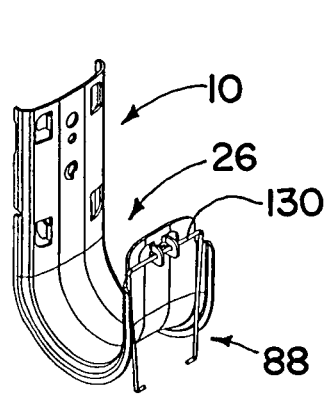 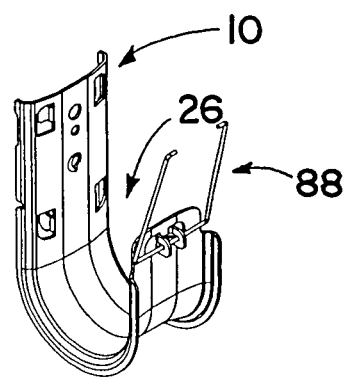
FIG. 7   FIG. 8

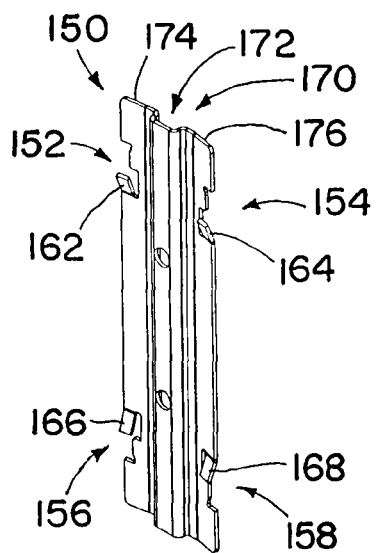
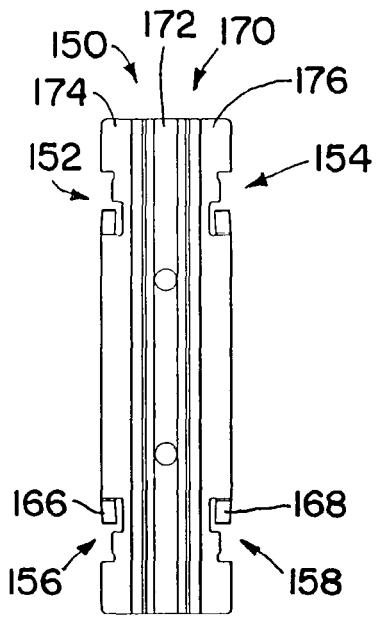
FIG. 14
FIG. 15
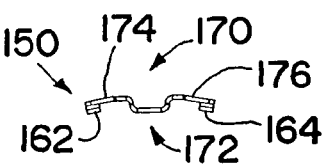
FIG. 16
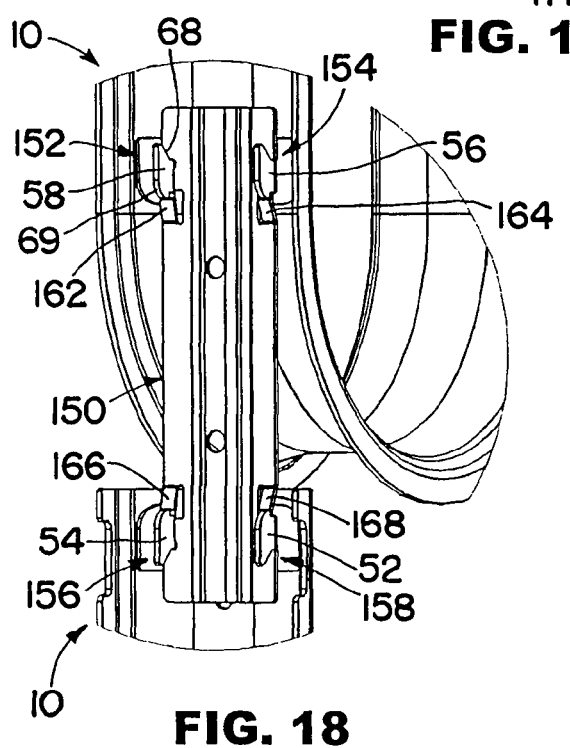
FIG. 18
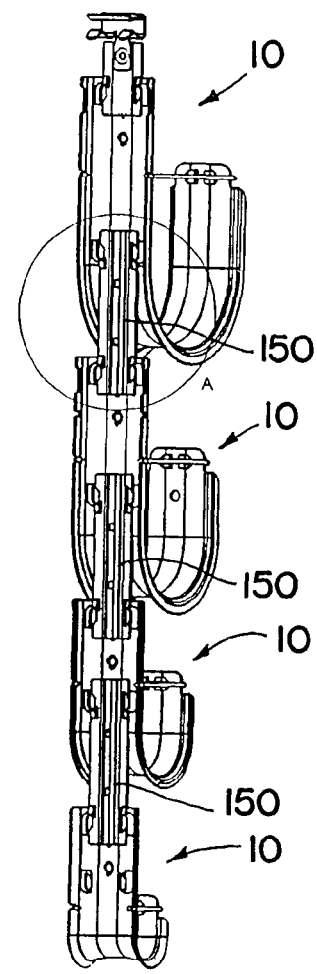
FIG. 17

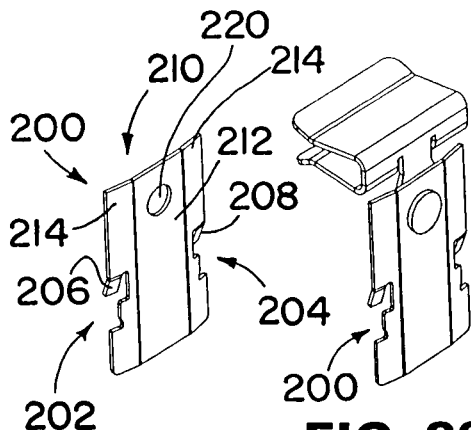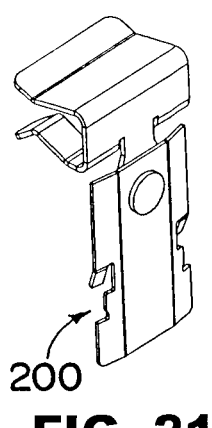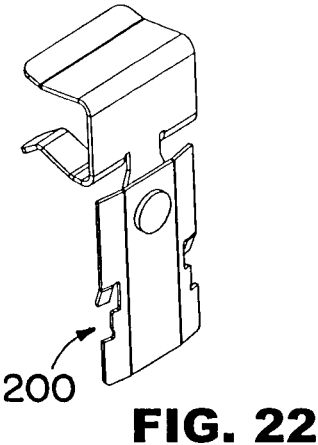
FIG. 19  FIG. 20  FIG. 21  FIG. 22
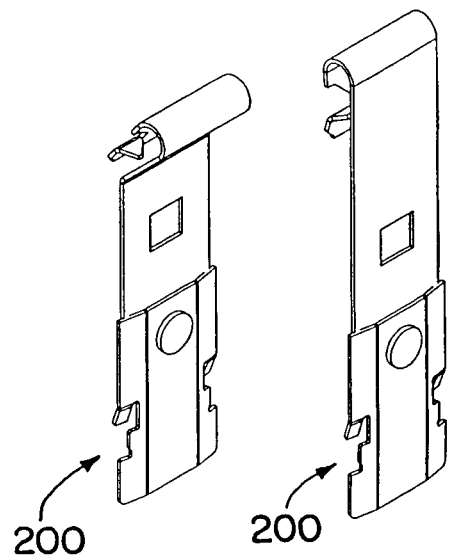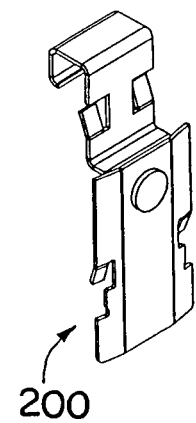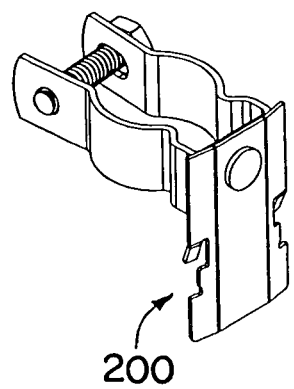
FIG. 23  FIG. 24  FIG. 25  FIG. 26

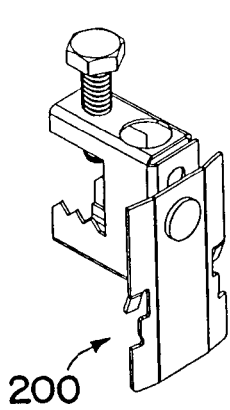 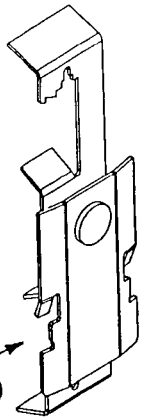 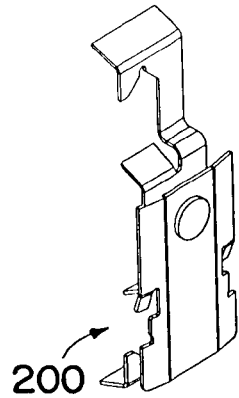 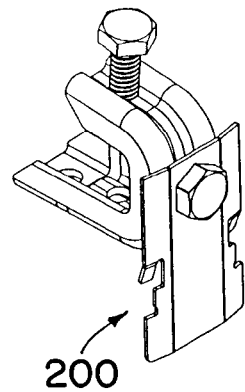
FIG. 27   FIG. 30   FIG. 29   FIG. 28
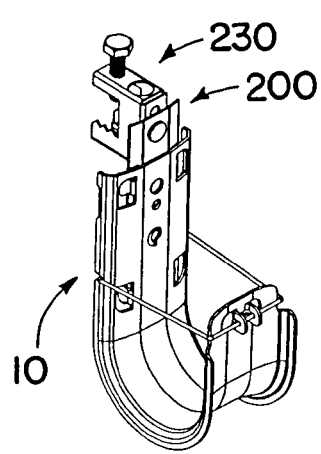 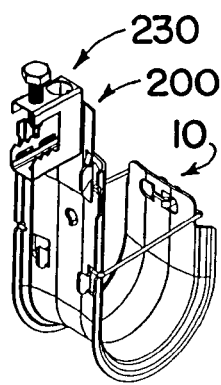 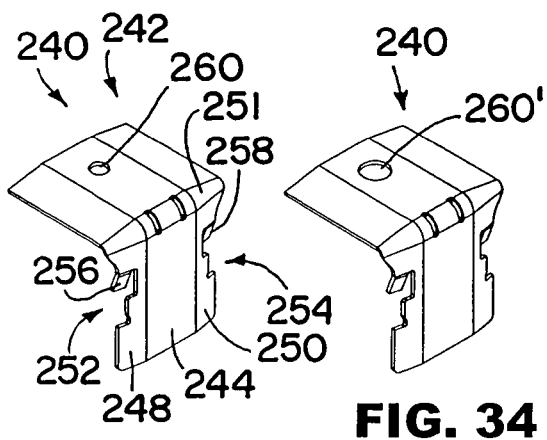
FIG. 31   FIG. 32   FIG. 33   FIG. 34

CABLE SUPPORT AND METHOD

This application claims priority under 35 USC 119 form U.S. Provisional Application No. 60/968,618, which is incorporated herein by reference in its entirety.

BACKGROUND OF THE INVENTION

1. Technical Field of the Invention

The invention relates in general to cable supports and methods.

2. Description of the Related Art

U.S. Pat. No. 5,740,994 describes a variety of J-hook cable supports that are usable with high performance communications cable, as well as other types of cables. Such cable supports allow cables to be supported without constrictions on the cables, and without damage to the cables. Cable supports of this sort are available from ERICO, Inc., of Solon, Ohio, USA.

Despite the benefits of J-hook cable supports previously available from ERICO, Inc., improvements in this area are possible.

SUMMARY OF THE INVENTION

According to an aspect of the invention, a cable support provides larger cable bend radii than prior supports.

According to another aspect of the invention, a cable support has a removable wire retainer that can be easily installed or removed in the field, and that can be used to open or close access to a cable-receiving area of the cable support.

According to yet another aspect of the invention, a cable support has tabs for receiving any of a variety of snap-on brackets. The snap-on brackets may include a tree bracket (for coupling multiple cable supports together), a straight bracket, and a right-angle bracket.

According to still another aspect of the invention, a cable support includes: a cable-receiving saddle; a stem emerging from one side of the saddle; and a tip emerging from the other side of the saddle. The cable support includes one or more of the following features: tabs on stem for receiving a snap-on bracket; wherein the snap-on bracket is a tree bracket for coupling multiple supports together; wherein the snap-on bracket is a straight bracket; wherein the snap-on bracket is an angle bracket; wherein a clip, clamp, hanger, or the like is permanently or temporarily coupled to the snap-on bracket; wherein the tabs each have a relatively narrow neck and a relatively broad body; wherein the tabs include two pairs of tabs; wherein the tabs are bent sheet metal tabs; wherein the brackets include notches for receiving the stem tabs; wherein the support is made of sheet metal; a wire retainer for selectively closing off a cable-receiving area of the cable support; wherein the stem has a pair of notches for receiving bent ends of the wire retainer; wherein the tip has protrusions for securing the wire retainer; wherein the protrusions include loops with holes for receiving the wire retainer therein; wherein the cable support has a J shape; wherein the saddle has a width of at least 2 inches; wherein the saddle includes a central portion with a width of at least 0.6 inches; wherein the central portion is flat except for curvature of the saddle; wherein the saddle also includes angled portions attached to sides of the central portion, wherein the angled portions curve away from the central portion; wherein the saddle further includes flanges attached to distal sides of the angled portions that are opposite proximate sides of the angled portions that are attached to the central portion; wherein the flanges are angled relative to the central portion; wherein the flanges are angled at about 50 degrees relative to the central portion; wherein the flanges are angled at about 45 degrees relative to the central portion; wherein the flanges each include two parts or portions that are angled relative to one another; wherein a depth of a cross section shape the saddle is at least 0.34 inches; wherein a depth of a cross section shape the saddle is at least 0.4 inches; wherein a depth of a cross section shape the saddle is at least 0.5 inches; wherein a depth of a cross section shape the saddle is at least 0.4 inches, with the diameter of the saddle being at least 2 inches; wherein a depth of a cross section shape the saddle is at least 0.5 inches, with the diameter of the saddle being at least 3 inches; wherein the saddle is semicircular; wherein the saddle has a composite bend radius of at least 2 inches; wherein the saddle has a composite bend radius of at least 2.5 inches; wherein the saddle has a composite bend radius of at least 3 inches wherein the saddle, the tip, and the stem are all parts of a single piece; wherein the cable support is made of steel; wherein the cable support is made of spring steel.

According to a further aspect of the invention, a cable support includes: a cable-receiving saddle; a stem emerging from one side of the saddle; and a tip emerging from the other side of the saddle. The stem includes tabs for receiving a snap-on bracket.

According to a still further aspect of the invention, a cable support includes: a cable-receiving saddle; a stem emerging from one side of the saddle; a tip emerging from the other side of the saddle; and a wire retainer used to selectively closing off a cable-receiving area of the cable support that is above the saddle and between the tip and the stem. The wire retainer passes around edges of the tip when used to close the cable-receiving area.

According to another aspect of the invention, a cable support includes: a cable-receiving saddle; a stem emerging from one side of the saddle; and a tip emerging from the other side of the saddle. The saddle is semicircular. The saddle has a composite bend radius of at least 2 inches. The saddle, the tip, and the stem are all monolithic parts of a single sheet metal piece.

According to still another aspect of the invention, a method of securing one or more cables includes: providing a cable support that includes: a cable-receiving saddle, a stem emerging from one side of the saddle, and a tip emerging from the other side of the saddle; installing a wire retainer through loops of the tip that have respective holes therein; placing the one or more cables in a cable-receiving area on the saddle; and securing the cables in the wire-receiving area using the wire retainer.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 5 is an oblique view of a second step in the method of installing the wire retainer;

FIG. 6 is an oblique view of a third step in the method of installing the wire retainer;

FIG. 7 is an oblique view of a fourth step in the method of installing the wire retainer;

FIG. 8 is an oblique view of a first step in a process of closing a cable-receiving area of the cable support using the installed wire retainer;

FIG. 14 is an oblique view of a tree mounting bracket in accordance with an embodiment of the invention, used for coupling together multiple cable supports;

FIG. 15 is a plan view of the bracket of FIG. 14;

FIG. 16 is an end view of the bracket of FIG. 14;

FIG. 17 is an oblique view showing coupling together of multiple cable supports using the bracket of FIG. 14;

FIG. 18 is a detailed view of a portion of FIG. 17;

FIG. 19 is an oblique view of a straight mounting bracket in accordance with an embodiment of the present invention;

FIG. 20 is an oblique view of the bracket of FIG. 19 coupled to a first purlin or flange clip;

FIG. 21 is an oblique view of the bracket of FIG. 19 coupled to a second purlin or flange clip;

FIG. 22 is an oblique view of the bracket of FIG. 19 coupled to a third purlin or flange clip;

FIG. 23 is an oblique view of the bracket of FIG. 19 coupled to a fourth purlin or flange clip;

FIG. 24 is an oblique view of the bracket of FIG. 19 coupled to a fifth purlin or flange clip;

FIG. 25 is an oblique view of the bracket of FIG. 19 coupled to a sixth clip;

FIG. 26 is an oblique view of the bracket of FIG. 19 coupled to a rod or pipe clamp;

FIG. 27 is an oblique view of the bracket of FIG. 19 coupled to a first beam or purlin clamp;

FIG. 28 is an oblique view of the bracket of FIG. 19 coupled to a second beam or purlin clip;

FIG. 29 is an oblique view of the bracket of FIG. 19 coupled to a first wire or rod hanger clip;

FIG. 30 is an oblique view of the bracket of FIG. 19 coupled to a second wire or rod hanger clip;

FIG. 31 is an oblique view showing a cable support coupled to the bracket of FIG. 19 and the clamp of FIG. 27;

FIG. 32 is another oblique view of the combination of FIG. 31;

FIG. 33 is an oblique view of an angled mounting bracket in accordance with an embodiment of the present invention;

FIG. 34 is an oblique view of an alternate embodiment angled mounting bracket in accordance with the present invention;

DETAILED DESCRIPTION

A J-hook cable support includes a semicircular saddle, a stem at one side of the saddle, and a tip at the other side of the saddle. The stem includes protruding tabs able to engage snap-on brackets in order to engage structural parts, or to couple multiple cable supports together. The stem may have two pairs of tabs at different heights along the stem away from the saddle. The tabs may be bent pieces of the metal of the stem, bent toward the back of the stem, away from the cable-receiving area defined by the saddle. The snap-on brackets may include one or more pairs of notches for engaging the tabs of one or more of the cable supports. Among the possible types of snap-on brackets are a tree installation bracket, which allows multiple cable supports to be coupled back-to-back and/or vertically, to form a tree of cable supports; a variety of mounting brackets for mounting cable supports to structure, such as by engaging various types of purlins; and various angle brackets for connecting one or more cable supports to structure using a fastener, such as by use of a nail, a screw, or a rivet. A wire retainer may be used to close off the cable-receiving area, with the wire coupled to both the tip and the stem.

Figure 1:
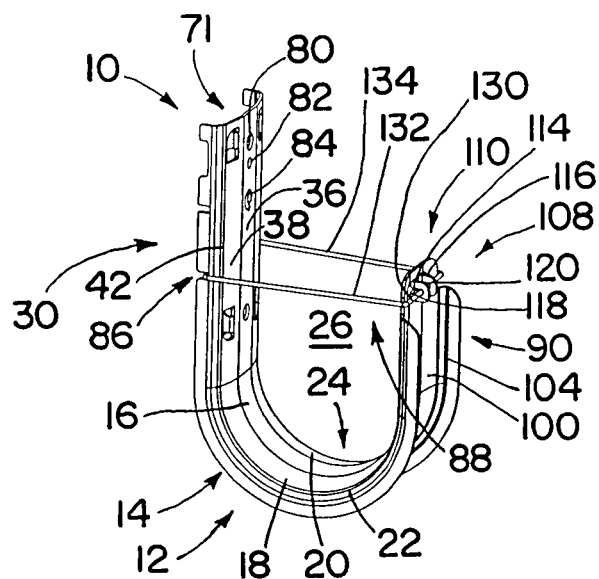
FIG. 1 is an oblique view of a cable support in accordance with an embodiment of the invention.
Figure 2:
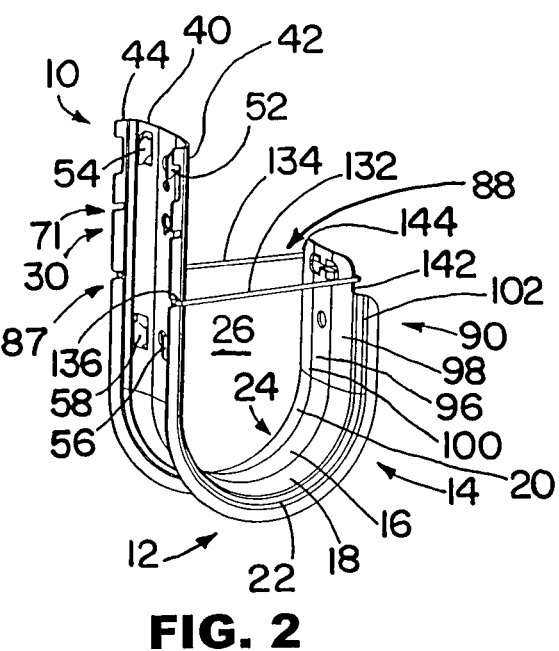
FIG. 2 is another oblique view of the cable support of FIG. 1, showing the back of the support.

Referring initially to FIGS. 1 and 2, a J-hook or J-shape cable support 10 includes a cable-receiving saddle 12. The saddle 12 is shown as a semicircular saddle, but it will be appreciated that the saddle 12 alternatively may have a different shape, for example having a combination of flat portions and curves. The saddle 12 has a curved inner surface 14 that is bulged toward the longitudinal middle of the saddle 12. The surface 14 has a flat central portion 16, with substantially no curvature in a direction along the axis of the saddle 12. On either side of the central portion 16 are angled portions 18 and 20 that angle away from the central portion 16. Distal flanges 22 and 24 emanate from the angled portions 18 and 20, angled further away from the central portion 16. The overall shape provided by the portions 16, 18, and 20, and the flanges 22 and 24, is a bulging shape, with the angled portions 18 and 20 and the flanges 22 and 24 providing a flared shape away from the central portion 16.

The central portion 16 of the surface may have a width of at least 0.6 inches (15.2 mm), although it will be appreciated that the central portion 16 may have other widths. The central portion 16 may be substantially flat, although it will be appreciated that the central portion 16 may alternatively have some curvature.

The angled portions 18 and 20 may have a curvature of about 3 inches (76 mm), curving way from the central portion 16. It will be appreciated that the angled portions 18 and 20 may have other curvatures, however.

The flanges 22 and 24 may be flat or curved. The flanges 22 and 24 may each have a single flat or curved surface, or may alternatively include multiple surfaces angled relative to one another. The flanges 22 and 24 may be angled away from the angled portions 18 and 20, such that the flanges 22 and 24 do not contact cables when the cables are ordinarily resting in the saddle 12.

The saddle 12 may have a width of at least 2 inches (50.8 mm), although it will be appreciated that the saddle 12 may alternately have other widths. The configuration of the saddle inner surface 14 may provide the cables or other objects in contact with it with a radius of curvature of at least 2 inches (5 cm), or alternatively at least 2.5 inches (6.3 cm). The saddle inner surface 14 helps in maintaining a minimum radius of curvature for cables in the cable support 10 supported by the saddle 12. The radius of the curved inner surface 16 may be selected to maintain a minimum radius required for installations of Category 6, Category 6A, Category 7, or higher Category cable. It will be appreciated that other suitable radii of curvature may be selected, for instance to conform with other minimum cable radii of curvature.

The inner surface 14 of the saddle 12 defines the bottom of a cable-receiving area 26 of the cable support 10. Cables are placed in the cable-receiving area 26, and rest on the inner surface 14. The flanges 22 and 24 provide rounded edges for contact with cables resting on the saddle 12, or being pulled over the saddle 12.

A stem 30 extends vertically from one end of the saddle 12. The stem 30 includes a vertically upward continuation of the saddle surface 14, with continuations of the flat central portion 16, the angled portions 18 and 20, and the flanges 22 and 24. This provides the stem 30 with the same cable-friendly surface (no corners or sharp edges) as the saddle 12. These corresponding continuations are designated by reference numbers 36-44 in the FIGS. 1 and 2.

Figure 3:
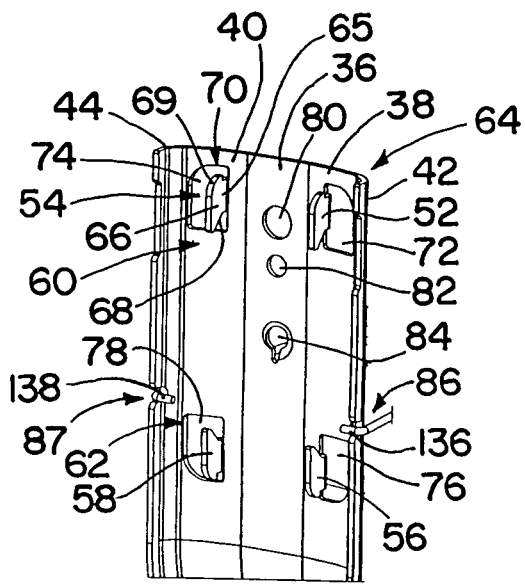
FIG. 3 is a detailed view of a portion of the back of the stem of the cable support of FIG. 1.

Referring now in addition to FIG. 3, the stem 30 has tabs 52, 54, 56, and 58. The tabs 52 and 56 protrude from in the stem angled portion 38, and the tabs 54 and 58 protrude from the angled portion 40. As explained in greater detail below, the tabs 52-58 are used to couple the stem 30 to one or more snap-on brackets, to couple multiple cable supports 10 together and/or to couple the cable support 10 to a structure member or surface. The tabs 52 and 54 constitute a first tab set 60, and the tabs 56 and 58 constitute a second tab set 62. The tab sets 60 and 62 are at different heights above saddle 12, with the first tab set 60 closer to a free end 64 of the stem 30 than the second tab set 62.

The tabs 52-58 each have narrow neck 65 that broadens out into a broader body 66. On one side of the body 66 of each of the tabs 52-58 there is a sloped edge surface 68. The sloped edge surfaces 68 face toward the center of the stem 30, the portion of the stem 30 between the tab sets 60 and 62. On the other side of each tab body 66 (facing away from the portion of the stem 30 between the tab sets 60 and 62) there is a curved edge surface 69 that leads to a step 70 at the neck 65.

The tabs 52-58 may be bent portions of the sheet metal of the stem 30. The tabs 52-58 protrude rearward from the stem 30, from a back side 71 of the stem 30, away from the side that is continuous with the inner surface 14 of the saddle 12. The tabs 52-58 may thus leave corresponding holes 72, 74, 76, and 78 in the angled portions 38 and 40.

The stem 30 may also have other holes for receiving fasteners. In the illustrated embodiment the fastener holes include a rivet hole 80, a nail hole 82, and a thread form screw hole 84. The fastener holes 80-84 may be used to mechanically couple the stem 30 to structure and/or to other cable supports. The fastener holes 80-84 are centered in the stem central portion 36, in a vertical line, at different heights above the saddle 12. It will be appreciated that different numbers of number, type, and/or configuration of fastener holes may be utilized instead.

The stem 30 includes a pair of notches 86 and 87 in the stem flanges 42 and 44. The notches 86 and 87 are used for receiving and securing a wire retainer 88, as explained below.

A tip 90 of the support 10 extends from the saddle 12, on the side opposite from the stem 30. The tip 90 may be substantially parallel to the stem 30. Alternatively the tip 90 may be angled slightly away from the stem 30, in order to facilitate placing cables in the cable-receiving area 26.

The tip 90, like the stem 30 includes a vertically upward continuation of the saddle surface 14, with continuations of the flat central portion 16, the angled portions 18 and 20, and the flanges 22 and 24. This provides the stem 30 with the same cable-friendly surface (no corners or sharp edges) as the saddle 12. These corresponding continuations are designated by reference numbers 96-104 in the FIGS. 1 and 2.

The tip 90 includes a flangeless portion 108 near its free end 110, where the flanges 102 and 104 do not extend. The tip 90 includes a pair of loops 114 and 116 for receiving and retaining the wire retainer 88. The loops 114 and 116 are tabs that are bent out from the tip angled portions 98 and 100, away from the cable-receiving area 26. The loops 114 and 116 have central circular holes 118 and 120 for receiving a round cross-section object. The holes 118 and 120 are closed holes, such that an object inserted in the holes 118 and 120 along the axes of the holes cannot be removed except by sliding it out along the axes The cable support 10 may be made of a suitable metal, such as a suitable spring steel. The various parts of the cable support 10 may be formed by suitable processes, such as stamping and bending.

The wire retainer 88 has a rectangular shape, with a central portion 130, a pair of legs 132 and 134, and a pair of bent ends 136 and 138. The legs 132 and 134 are substantially parallel to one another, and are at substantially right angles to the central portion 130. The bent ends 136 and 138 are bent inward at distal ends of the legs 132 and 134, farthest from the central portion 130. The bent ends 136 and 138 are bent inward toward a centerline of the wire retainer 88. The retainer 88 may be made from a single piece of wire, bent to form the various parts 130-138.

When the retainer 88 is installed, the retainer central portion 130 is held in place by the loops 114 and 116 of the tip 90. The retainer legs 132 and 134 extend around edges 142 and 144 of the tip angled portions 98 and 100. The bent ends 136 and 138 of the retainer 88 fit into and are retained by the notches 86 and 87 in the stem 30.

Figure 4:
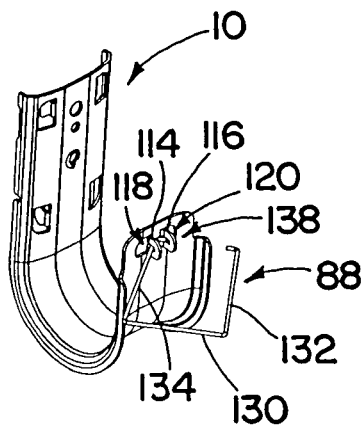
FIG. 4 is an oblique view of a first step in a method of installing a wire retainer on the cable support of FIG. 1.

FIGS. 4-13 illustrate a pair of processes for installing the wire retainer 88 on the stem 30 and the tip 90, to secure cables, wires, conduits, or other objects within in the cable-receiving area 26. FIGS. 4-6 show how the wire retainer 88 may be installed into the loops 114 and 116. First the bent end 138 is inserted into the hole 118 of the loop 114, and from there into the hole 120 of the loop 116 (FIG. 4). Then the retainer 88 is turned, with the leg 134 inserted through the holes 118 and 120 (FIG. 5). Another rotation of the retainer 88 allows the retainer central portion 130 to be inserted through the holes 118 and 120 (FIG. 6). The retainer 88 is thus secured within the loops 114 and 116. As shown in FIG. 7, the retainer 88 is free to rotate about its central portion 130, and may be allowed to hang down, outside of the cable-receiving area 26. This allows unfettered access to the cable-receiving area 26, for instance to allow entry, exit, or repositioning of cables or other objects.

Figure 9:
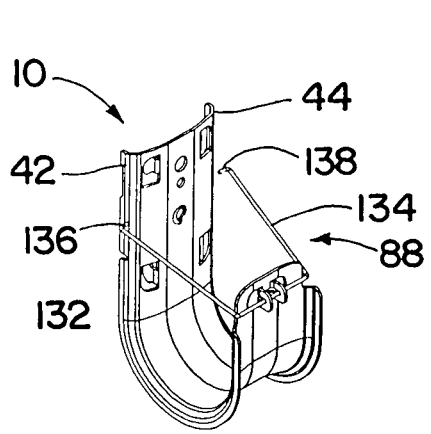
FIG. 9 is an oblique view of a second step of the closing process.
Figure 10:
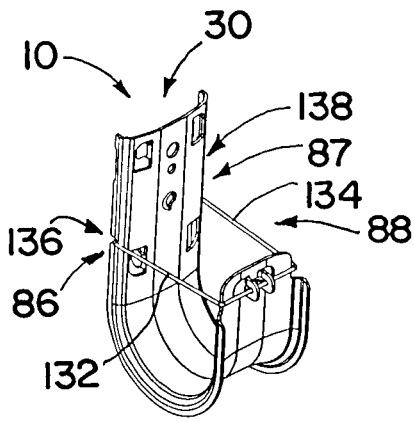
FIG. 10 is an oblique view of a third step of the closing process.

As shown in FIGS. 8-10, the retainer 88 may be used to close the cable-receiving area 26. First the retainer 88 is rotated upward, as illustrated in FIG. 8. As the rotation is continued, the retainer legs 132 and 134 are pulled apart, to enable the legs 132 and 134 and the bent ends 136 and 138 to clear the stem flanges 42 and 44 (FIG. 9). FIG. 10 shows the wire retainer 88 is in the fully installed position, with the bent ends 136 and 138 in the stem flange notches 86 and 87. The stem 30 is wider than the unstressed configuration of the wire retainer 88. This means that some elastic deformation of the retainer legs 132 and 134 occurs to install the retainer 88 on the stem 30. When installed, the legs 132 and 134 exert an inward resilient force against the sides of the stem 30. This resilient force aids in keeping the bent ends 136 and 138 in the notches 86 and 87.

Figure 11:
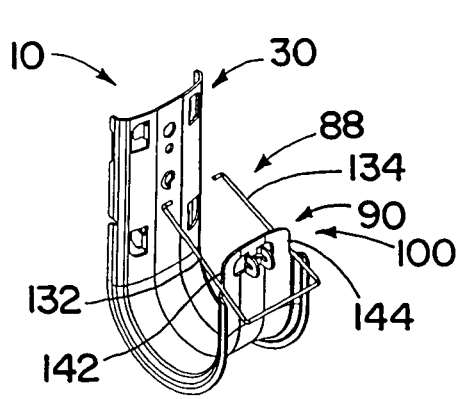
FIG. 11 is an oblique view of a first step of an alternate method of installing the wire retainer on the cable support of FIG. 1, to close off the cable-receiving area of the cable support.
Figure 12:
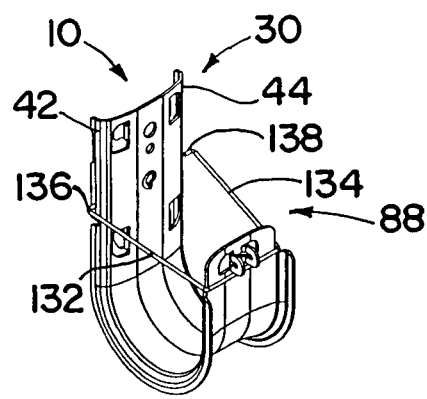
FIG. 12 is an oblique view of a second step of the alternate method.
Figure 13:
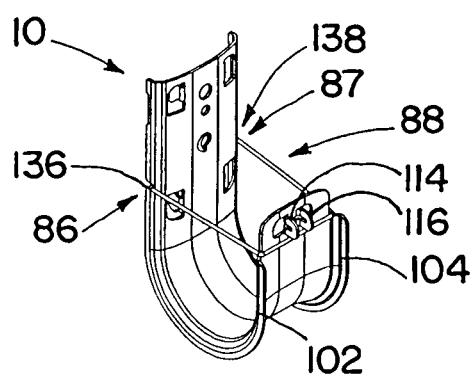
FIG. 13 is an oblique view of a third step of the alternate method.

FIGS. 11-13 illustrate an alternate process for installing the wire retainer 88. The wire retainer 88 slides or is placed over the flangeless portion 108 of the tip 90 (FIG. 11). At this step the legs 132 and 134 of the retainer 88 may be in contact with the tip edges 142 and 144 in the tip flangeless portion 108.

FIG. 12 illustrates the next step in the installation process, in which the legs 132 and 134 are bent apart to clear the stem flanges 42 and 44. FIG. 13 shows the retainer 88 fully installed, with the retainer bent ends 136 and 138 in the stem flange notches 86 and 87. The loops 114 and 116 serve to keep the retainer 88 from sliding off the top of the tip 90, even though the retainer 88 is not inserted into the holes 118 and 120 of the loops 114 and 116. The tip flanges 102 and 104 prevent the wire retainer 88 from sliding down the tip 90.

The installation method of FIGS. 3-9 allows the retainer 88 to be coupled to the tip 90 even while not preventing access to the cable-receiving area 26. The method of 11-13 requires fewer steps and less space, and allows for easier removal of the retainer 88.

FIGS. 14-16 show a tree mounting bracket 150 used for coupling together a pair of the cable supports 10 (FIG. 1). The mounting bracket 150 has a generally rectangular shape, with four notches 152, 154, 156, and 158 for receiving and securing pairs of stem tabs 52, 54, 56, and 58 (FIG. 2) of two different cable supports 10, in order to secure the cable supports 10 together. The notches 152-158 are in two sets, located at different distances along the bracket 150. Tabs 162, 164, 166, and 168 extend at an angle to the body 170 of the mounting bracket 150, adjacent to the respective notches 152-158. The tabs 162-168 are located adjacent to the notches 152-158, at the ends of the notches 152-158 closest to the center of the mounting bracket 150. The tabs 162-168 aid in maintaining the stem tabs 52-58 in the notches 152-158.

The bracket body 170 has a central channel 172, and a pair of angled portions 174 and 176. The angled portions 174 and 176 may be configured to have substantially the same angle between them as the stem angled portions 38 and 40 (FIG. 1). The central channel 172 provides structural support for the bracket 150.

The bracket 150 may be made from spring steel or another suitable material. The bracket 150 may be formed using suitable processes, such as stamping.

FIGS. 17 and 18 show use of brackets 150 to couple together the stems 30 of multiple cable supports 10. The bottom stem tabs 56 and 58 of one cable support 10 engage the top notches 152 and 154 and the top tabs 162 and 164 of the bracket 150. The top stem tabs 52 and 54 of another cable support 10 engage the bottom notches 156 and 158 and the top tabs 166 and 168 of the bracket 150. Inserting the stem tabs 52-58 into the notches 152-158 causes the curved edge 69 of each of the stem tabs 52-58 to come into contact with one of the tabs 162-168. The contact resiliently deforms the tabs 162-168, causing the tabs 162-168 to press the stem tabs 52-58 against the opposite ends of the notches 152-158. This aids in retaining the stem tabs 52-58 in the bracket notches 152-158, with the sloped edge surfaces 68 of the stem tabs also discouraging dislodgement of the tabs 52-58 from the bracket notches 152-158.

FIG. 19 shows a straight mounting bracket 200 that may be coupled to the cable support 10 (FIG. 1), to couple the cable support 10 to structure either directly or by use of any of a variety of clips or clamps. The mounting bracket 200 has a pair of notches 202 and 204 that have respective angled tabs 206 and 208 adjoining them. The notches 202 and 204 and the tabs 206 and 208 may function in a manner similar to the tabs 152-158 and the tabs 162-168 of the mounting bracket 150 (FIG. 14). That is, the notches 202 and 204 and the tabs 206 and 208 may be used to engage stem tabs 52 and 54 (FIG. 2) of the cable support 10, to secure the mounting bracket 200 to the cable support 10.

The mounting bracket 200 has a bracket body 210 with a flat central portion 212, and angled portions 214 and 216 angled away from the central portion 212. The angled portions 214 and 216 may be configured to have the same angle between them as the stem angled portions 38 and 40 (FIG. 1). The central portion 212 has a hole 220 therein. The hole 220 may be used to receive a rivet, threaded fastener, or other fastener, usable to secure the bracket 200 to a structural member or to a mounting clip or clamp.

FIGS. 20-25 show configurations where the mounting bracket 200 is coupled to various configurations of purlin or flange clips by use of rivets. FIG. 26 shows the mounting bracket 200 coupled by a rivet to a pipe or rod clamp for engaging a circular cross section object. FIGS. 27 and 28 show the mounting bracket 200 coupled by a rivet or bolt to beam or purlin clamps for engaging a flange of a beam or purlin. FIGS. 29 and 30 show the mounting bracket 200 to hangers for coupling to a rod or wire used for hanging items.

FIGS. 31 and 32 show one example of how the mounting bracket 200 coupled to the cable support 10. In the illustrated example the mounting bracket 200 is used to couple a beam or purlin clamp 230 to the cable support 10.

FIG. 33 shows an angle bracket 240 that can be coupled to the cable support 10 (FIG. 1). The bracket 240 has a bracket body 242 that has a similar cross-section shape to that of the bracket body 210 of the bracket 200 (FIG. 18), with a flat central portion 244 and angled portions 248 and 250.

Figure 35:
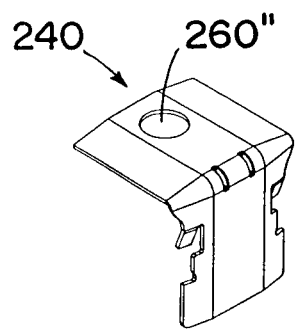
FIG. 35 is an oblique view of another alternate embodiment angled mounting bracket in accordance with the present invention.

The bracket body 242 has a substantially right-angle bend 251 bisecting it along its length. It will be appreciated that the bracket 240 may alternatively have a bend of a different extent. On one side of the bend 251 the bracket 240 has a pair of notches 252 and 254 that have respective angled tabs 256 and 258 adjoining them. The notches 252 and 254 and the tabs 256 and 258 may be substantially identical in configuration and function to the notches 202 and 204 and the tabs 206 and 208 (FIG. 19) of the bracket 200. One the other side of the bend 251 the bracket 240 has a hole 260. The hole 260 may be used to receive a rivet, threaded fastener, or other fastener, usable to secure the bracket 200 to a structural member or to a mounting clip or clamp. FIGS. 34 and 35 show alternate configurations of the bracket 240 with larger diameter holes 260' and 260", respectively.

Figure 36:
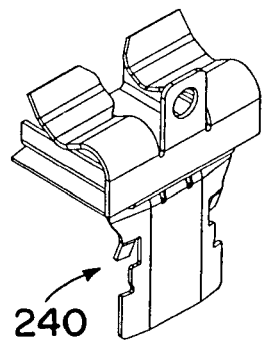
FIG. 36 is an oblique view of the bracket of FIG. 33 coupled to a first clip.
Figure 37:
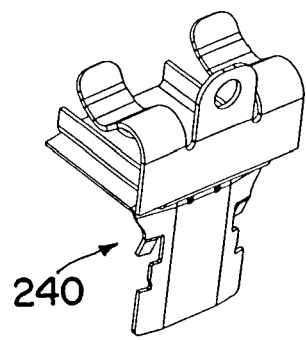
FIG. 37 is an oblique view of the bracket of FIG. 33 coupled to a second clip.
Figure 38:
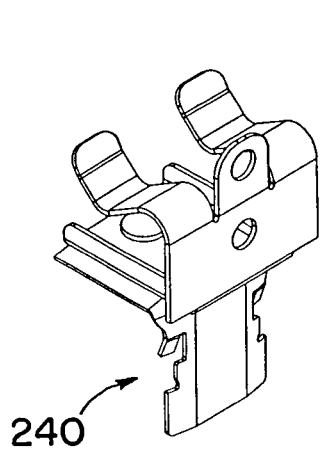
FIG. 38 is an oblique view of the bracket of FIG. 33 coupled to a third clip.
Figure 39:
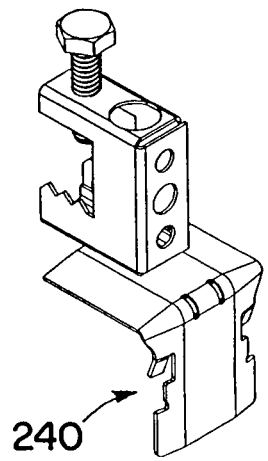
FIG. 39 is an oblique view of the bracket of FIG. 33 coupled to a first beam clamp.
Figure 40:
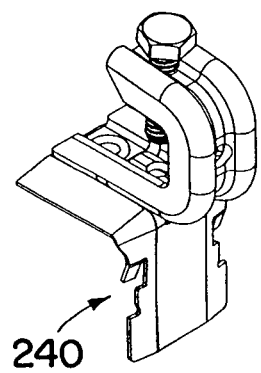
FIG. 40 is an oblique view of the bracket of FIG. 33 coupled to a second beam clamp.

FIGS. 36-38 show the bracket 240 coupled to various types of clips, for engaging purlin edges or other structures. FIGS. 39 and 40 show the mounting bracket 240 coupled by rivet(s) or bolt(s) to beam or purlin clamps for engaging a flange of a beam or purlin.

Figure 41:
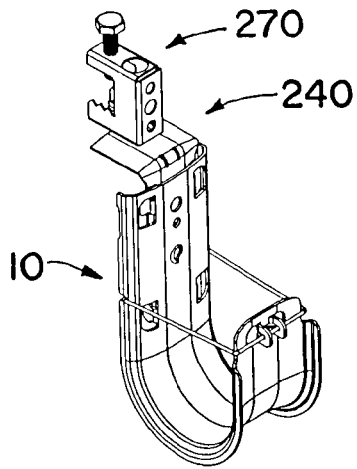
FIG. 41 is an oblique view showing a cable support coupled to the bracket of FIG. 33 and the clamp of FIG. 39.
Figure 42:
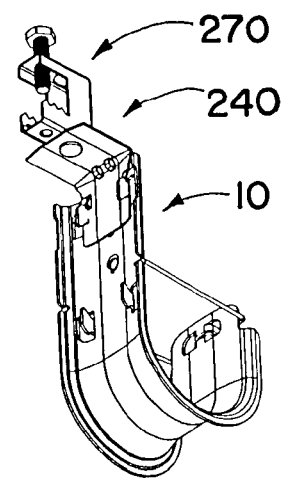
FIG. 42 is another oblique view of the combination of FIG. 41.

FIGS. 41 and 42 show one example of use of the right-angle mounting bracket 240. The illustrated example shows the mounting bracket 240 used to couple a beam or purlin clamp 270 to the cable support 10.

Figure 43:
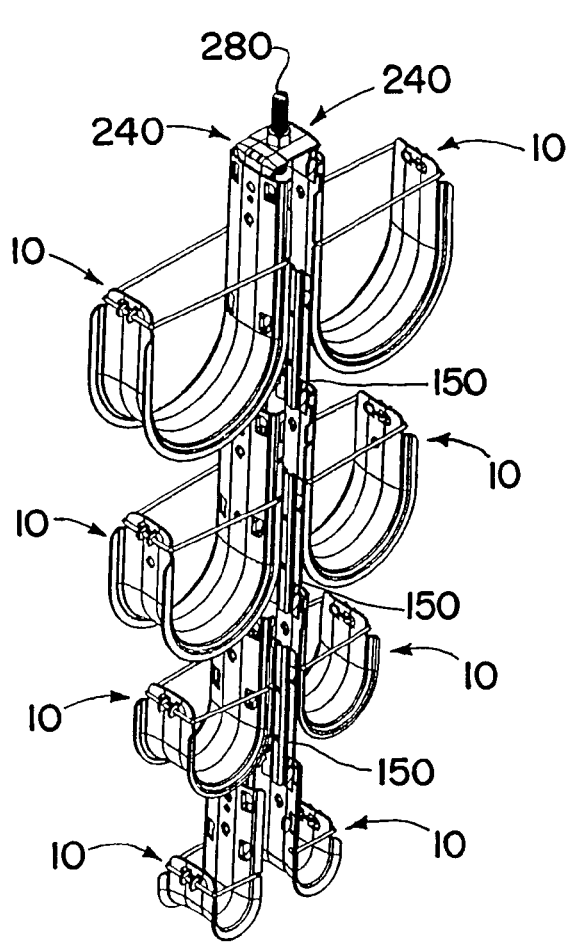
FIG. 43 is an oblique view of a combination of cable supports, coupled to a threaded rod using mounting brackets described herein, according to a combination of the present invention.
Figure 44:
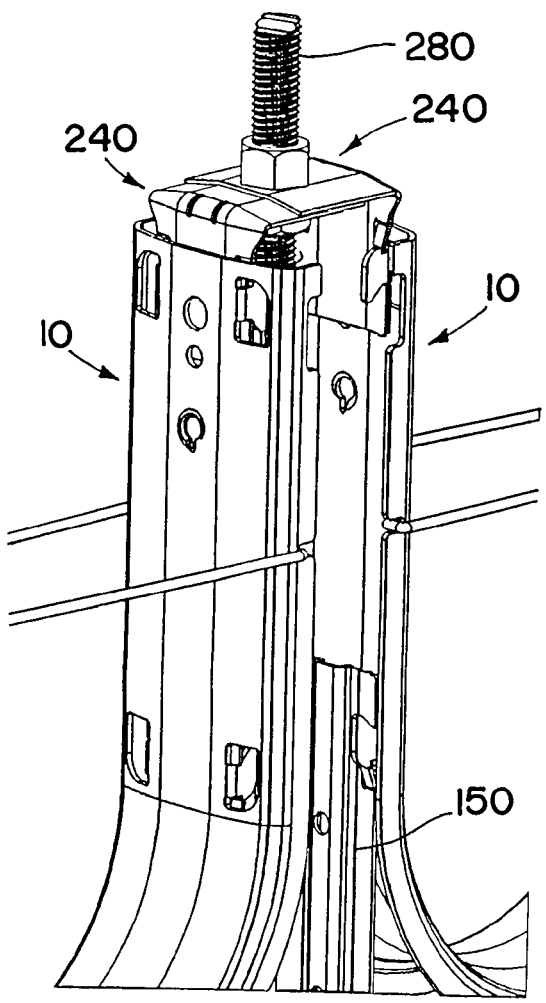
FIG. 44 is a detailed view of part of the combination of FIG. 43.

FIGS. 43 and 44 illustrate how the various brackets can be combined to secure several cable supports 10. A pair of angle brackets 240 are used to couple a pair of cable supports 10 to a threaded rod 280. Tree brackets 150 couple together additional cable supports 10 to the cable supports coupled to the angle brackets 240. Through the use of the brackets 150 and 240 eight cable supports 10 of various sizes are coupled to a single support structure, the threaded rod 280.

Figure 45:
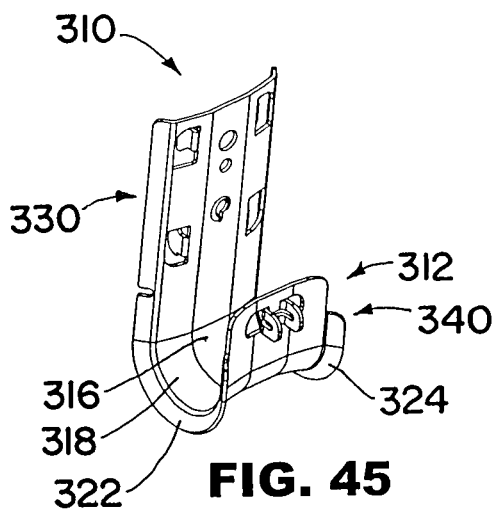
FIG. 45 is an oblique view of an embodiment cable support in accordance with the present invention.
Figure 46:
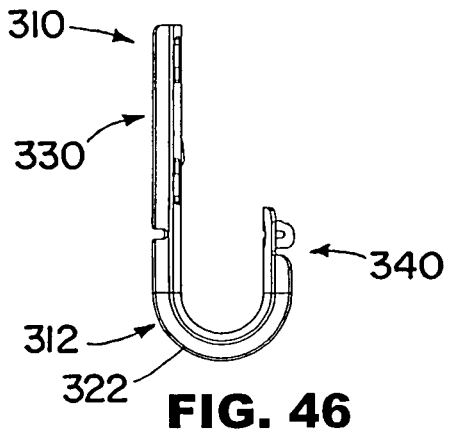
FIG. 46 is a side view of the cable support of FIG. 45.
Figure 47:
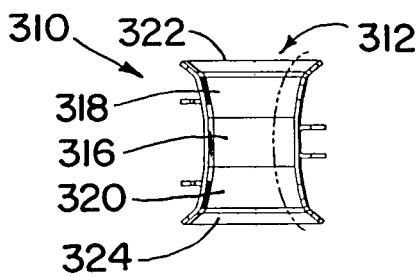
FIG. 47 is a bottom view of the cable support of FIG. 45.

FIGS. 45-47 show a cable support 310 with a 1 inch (25.4 mm) diameter on its saddle 312. The saddle central portion 316 is flat (except for the semicircular shape of the saddle 312), and has a width of 0.6 inches (15.2 mm). The saddle angled portions 318 and 320 have a curvature of 3 inches (76.2 mm). The combined width of the central portion 316 and the angled portions 318 and 320 (the distance between the distal end of the angled portion 318 and the distal end of the angled portion 320) is 1.551 inches (39.39 mm). The flanges 322 and 324 are at an angle of 50 degrees relative to the plane of the central portion 316. The overall width of the saddle 312, the distance from the distal end of the flange 322 to the distal end of the other flange 324 is 2 inches (50.8 mm). The depth of the saddle 312, the perpendicular distance from the ends of the flanges 322 and 324 to the plane of the central portion 316, is 0.34 inches (8.5 mm).

A stem 330 extends to a height of 3.3 inches (83.8 mm) above the saddle 312. A tip 340 extends to a height of 1.06 inches (26.9 mm) above the saddle 312.

Figure 48:
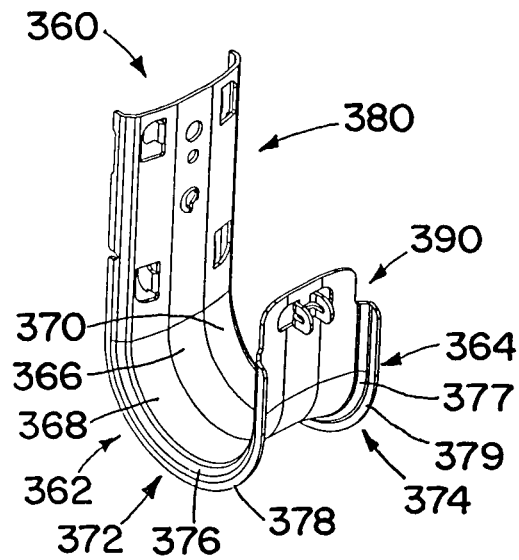
FIG. 48 is an oblique view of another embodiment cable support in accordance with the present invention.
Figure 49:
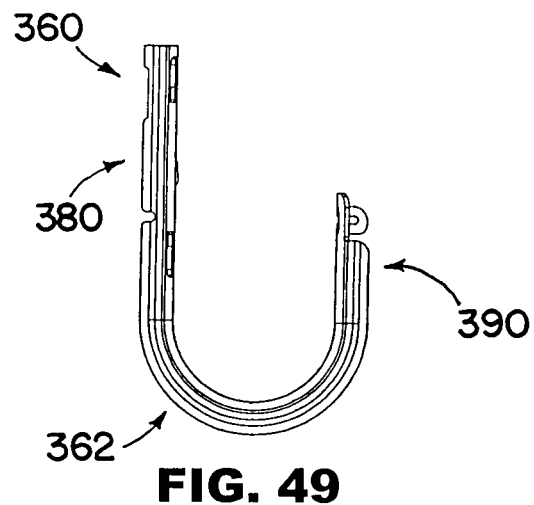
FIG. 49 is a side view of the cable support of FIG. 48.
Figure 50:
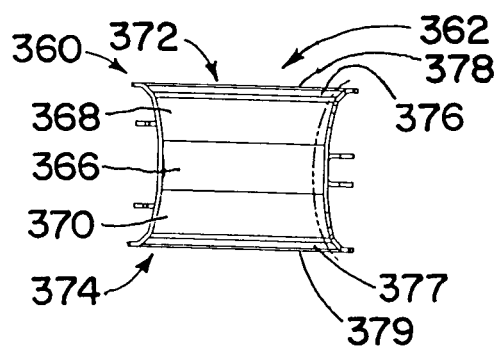
FIG. 50 is a bottom view of the cable support of FIG. 48.

FIGS. 48-50 show a cable support 360 with a 2 inch (50.8 mm) diameter on its saddle 362. The saddle central portion 366 is flat (except for the semicircular shape of the saddle 362), and has a width of 0.6 inches (15.2 mm). The saddle angled portions 368 and 370 have a curvature of 3 inches (76.2 mm). The combined width of the central portion 366 and the angled portions 368 and 370 (the distance between the distal end of the angled portion 368 and the distal end of the angled portion 370) is 1.57 inches (39.8 mm). The flanges 372 and 374 are two part flanges, having respective proximal portions 376 and 377 emerging from the angled portions 368 and 370, and having respective distal portions 378 and 379. The proximal portions 376 and 377 each are at an angle of 45 degrees relative to the plane of the central portion 366. The distal portions 378 and 379 are at angles of 45 degrees relative to their respective proximal portions 376 and 377. This makes the distal portions 378 and 379 substantially perpendicular to the central portion 366. The overall width of the saddle 362, the distance from the distal end of the flange 372 to the distal end of the other flange 374 is 2 inches (50.8 mm). The depth of the saddle 362, the perpendicular distance from the ends of the distal flange portions 378 and 379 to the plane of the central portion 366, is 0.4 inches (10.2 mm). A stem 380 extends to a height of 3.39 inches (86.1 mm) above the saddle 362. A tip 390 extends to a height of 1.6 inches (40.6 mm) above the saddle 362.

Figure 51:
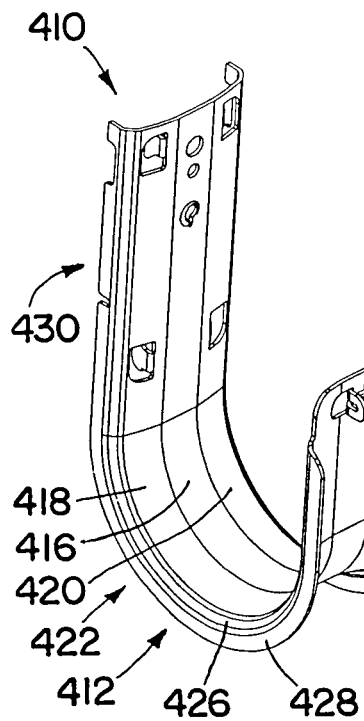
FIG. 51 is an oblique view of yet another embodiment of a cable support in accordance with the present invention.
Figure 52:
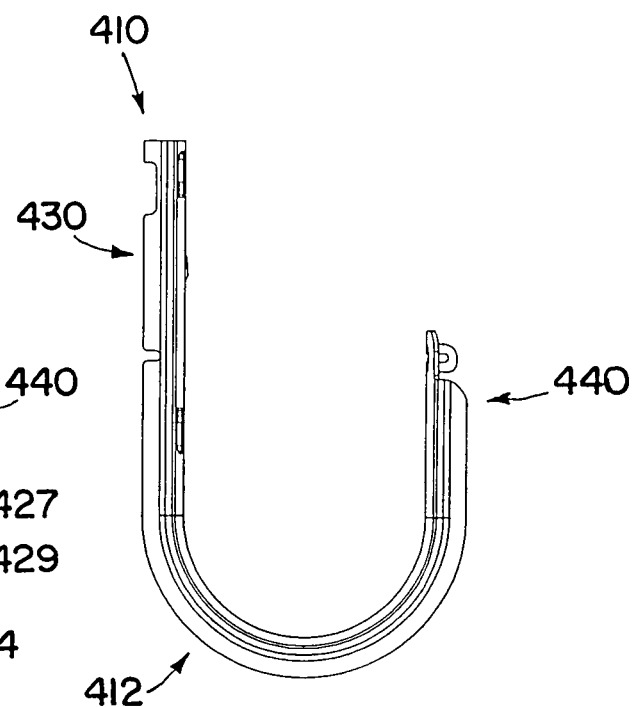
FIG. 52 is a side view of the cable support of FIG. 51.
Figure 53:
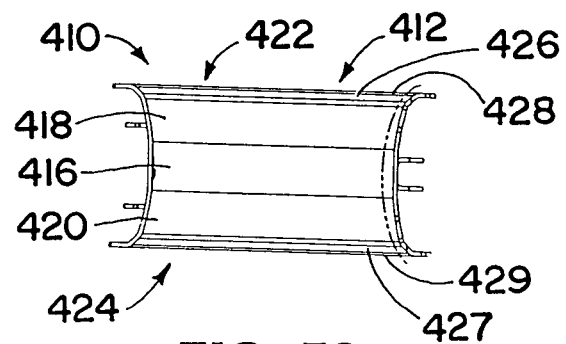
FIG. 53 is a bottom view of the cable support of FIG. 51.

FIGS. 51-53 show a cable support 410 with a 3 inch (76.2 mm) diameter on its saddle 412. The saddle central portion 416 is flat (except for the semicircular shape of the saddle 412), and has a width of 0.6 inches (15.2 mm). The saddle angled portions 418 and 420 have a curvature of 3 inches (76.2 mm). The combined width of the central portion 366 and the angled portions 418 and 420 (the distance between the distal end of the angled portion 418 and the distal end of the angled portion 420) is 1.57 inches (39.8 mm). The flanges 422 and 424 are two part flanges, having respective proximal portions 426 and 427 emerging from the angled portions 428 and 420, and having respective distal portions 428 and 429. The proximal portions 426 and 427 each are at an angle of 45 degrees relative to the plane of the central portion 416. The distal portions 428 and 429 are at angles of 45 degrees relative to their respective proximal portions 426 and 427. This makes the distal portions 428 and 429 substantially perpendicular to the central portion 416. The overall width of the saddle 412, the distance from the distal end of the flange 422 to the distal end of the other flange 424 is 2 inches (50.8 mm). The depth of the saddle 412, the perpendicular distance from the ends of the distal flange portions 428 and 429 to the plane of the central portion 416, is 0.5 inches (12.7 mm). Larger-diameter saddles may utilize a similar cross-sectional configuration.

A stem 430 extends to a height of 4.62 inches (117.3 mm) above the saddle 412. A tip 440 extends to a height of 2.29 inches (58.2 mm) above the saddle 412.

The dimensions described above may result in improved properties for the various cable supports. In particular, the various depths and shapes for the cable supports may make the cable supports easier to form. The depths and cross-section shapes for the saddles may provide greater strength in pull tests, for example, than has been achieved in prior j-shape cable supports. The shapes also aid in preventing unwanted saddle deflection when the supports are under load.

It will be appreciated that the dimensions shown in the specific embodiments shown in FIGS. 45-53 are particular to those specific embodiments. Other suitable dimensions and configurations may also be used.

It will also be appreciated that the various cable support systems described herein provide a multitude of advantages over the various systems in use. Some of these advantages have been discussed above. In addition, the coupling of cable supports together without the need to use threaded fasteners provides a significant time saving in installation. The employment of spring steel cable supports having the various configurations described herein allows large loads to be supported, such as by trees of multiple cable supports coupled together as described above, both in back-to-back coupling and top-to-bottom coupling. The ability to couple various brackets to the cable support increases its versatility in coupling to various types of building structure.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A cable support comprising:
a cable-receiving saddle;
a stem emerging from one side of the saddle;
a tip emerging from the other side of the saddle; and
a wire retainer used to selectively closing off a cable-receiving area of the cable support that is above the saddle and between the tip and the stem;
wherein a widest width of the saddle is substantially the same as a widest width of the tip;
wherein the wire retainer has a central portion and a pair of legs at opposite ends of the central portion; and
wherein the legs of the wire retainer pass around outside edges of the tip when the wire retainer is used to close the cable-receiving area, with the wire retainer thereby passing around distal sides of the tip, with the central portion extending to the outside edges, and with no part of the tip passing outside of the legs of the wire retainer.

2. The cable support of claim 1, wherein the stem has a pair of notches for receiving bent ends of the wire retainer.

3. The cable support of claim 1, wherein the saddle, the tip, and the stem are all monolithic parts of a single sheet metal piece.

4. The cable support of claim 1, wherein, when the wire retainer is used to close the cable-receiving area, the central portion is against an outer surface of the tip.

5. The cable support of claim 1, wherein the tip has protrusions for securing the wire retainer.

6. The cable support of claim 5, wherein the protrusions include loops with holes for receiving the central portion of the wire retainer therein.

7. The cable support of claim 6, wherein the retainer may be selectively removed from the loops by an end user, without damage to the cable support.

8. The cable support of claim 6, wherein the central portion of the wire retainer is in the holes in the loops.

9. A cable support comprising:
a cable-receiving saddle;
a stem emerging from one side of the saddle;
a tip emerging from the other side of the saddle; and
a wire retainer used to selectively closing off a cable-receiving area of the cable support that is above the saddle and between the tip and the stem;
wherein the wire retainer has a central portion and a pair of legs at opposite ends of the central portion;
wherein the legs of the wire retainer pass around outside edges of the tip when the wire retainer is used to close the cable-receiving area, with the wire retainer thereby passing around distal sides of the tip, and with the central portion extending to the outside edges;

wherein the stem has a pair of notches for receiving bent ends of the wire retainer; and
wherein the notches are in outer flanges at edges of the stem.

10. A cable support comprising:
a cable-receiving saddle;
a stem emerging from one side of the saddle;
a tip emerging from the other side of the saddle;
a first snap-on bracket; and
a second snap-on bracket;
wherein the stem includes a top pair of tabs, and a bottom pair of tabs closer to the saddle than the top pair of tabs;
wherein the first snap-on bracket is coupled to the top pair of tabs; and
wherein the second snap-on bracket is coupled to the bottom pair of tabs; wherein the top pair of tabs; wherein the top pair of tabs and the bottom pair of tabs each has a relatively narrow neck coupled to the rest of the stem, and a relatively broad body; and wherein each of the top pair of tabs and the bottom pair of tabs has a nonuniform extent in a vertical direction of extent from the saddle, being made of wider material in the relatively broad body, with the wider material in the broad body having a greater material thickness in the vertical direction than material in the relatively narrow neck.

11. The cable support of claim 10,
wherein the stem extends in vertical direction of extent from the saddle; and
wherein the tabs of the pairs of tabs are substantially parallel to the vertical direction of extent.

12. The cable support of claim 10, wherein one of the snap-on brackets is one of a straight bracket, an angle bracket, or a tree bracket for coupling multiple cable supports together.

13. The cable support of claim 10, further comprising a clip, clamp, or hanger that is permanently or temporarily coupled to one of the snap-on brackets.

14. The cable support of claim 10, wherein one of the snap-on brackets has notches for receiving the tabs.

15. The cable support of claim 10, wherein the tabs are bent sheet metal tabs extending from a back side of the stem that is in an opposite direction from the saddle.

16. The cable support of claim 15, wherein the tabs of the pairs of tabs are substantially planar.

17. A cable support comprising:
a cable-receiving saddle;
a stem emerging from one side of the saddle; and
a tip emerging from the other side of the saddle;
wherein the stem includes two pairs of tabs;
wherein the two pairs of tabs include:
a top pair of tabs capable of receiving a first snap-on bracket; and
a bottom pair of tabs, closer to the saddle than the top pair of tabs, capable of receiving a second snap-on bracket;
wherein the two pairs of tabs are bent sheet metal tabs extending from a back side of the stem that is in an opposite direction from the saddle;
wherein the stem extends in a vertical direction of extent from the saddle;
wherein the bent sheet metal tabs of the two pairs of tabs are substantially parallel to the vertical direction of extent; and
wherein the bent sheet metal tabs of the two pairs of tabs each have a relatively narrow neck coupled to the rest of the stem, and a relatively broad body; and wherein each of the bent sheet metal tabs of the two pairs of tabs has a nonuniform extent in the vertical direction, being made of wider material in the relatively broad body, with the wider material in the broad body having a greater material thickness in the vertical direction than material in the relatively narrow neck.

18. The cable support of claim 17, wherein the body of each of the tabs has a sloped edge surface that faces toward a portion of the stem that is between the top pair of tabs and the bottom pair of tabs.

19. The cable support of claim 18, wherein the body of each of the tabs has a curved edge surface that faces away from the portion of the stem that is between the top pair of tabs and the bottom pair of tabs.

20. The cable support of claim 17,
wherein the stem has multiple fastener holes therein; and
wherein the fastener holes includes a thread form screw hole.

21. The cable support of claim 17, wherein the saddle, the tip, and the stem are all monolithic parts of a single sheet metal piece.

22. The cable support of claim 17,
wherein the stem has a central portion, and a pair of angled portions on opposite respective sides of the central portion;
wherein the bent sheet metal tabs of the two pairs of tabs protrude from the angled portions; and
wherein the angled portions curve away from the central portion in a direction in which the bent sheet metal tabs of the two pairs of tabs protrude.

23. The cable support of claim 22,
wherein the stem has curved flanges, with the angled portions between the central portion and respective of the curved flanges; and
wherein the angled portions and the flanges providing a flared shape away from the central portion on opposite sides of the central portion.

24. The cable support of claim 17, wherein the top pair of tabs is symmetric to the bottom pair of tabs about a portion of the stem that is between the top pair of tabs and the bottom pair of tabs.

25. The cable support of claim 17, wherein, for each of the bent sheet metal tabs of the two pairs of tabs, in moving along the tab away from the stem, from the relatively narrow neck to the relatively broad body, material of the tab simultaneously increases in vertical extent in opposite vertical directions, both in an up direction and a down direction.

* * * * *